US012710081B2

(12) United States Patent
Shahin et al.

(10) Patent No.: US 12,710,081 B2
(45) Date of Patent: Aug. 18, 2026

(54) MULTI-PART BRAKE CALIPER HAVING AT LEAST ONE HOLLOW SECTION

(71) Applicant: HL MANDO CORPORATION, Pyeongtaek (KR)

(72) Inventors: Hatem Shahin, Pfaffenhofen (DE); Moritz Riemer, Waldems (DE); Lothar Wagner, Simmern (DE); Kai Braun, Friedrichsdorf (DE)

(73) Assignee: HL MANDO CORPORATION, Pyeongtaek (KR)

( * ) Notice: Subject to any disclaimer, the term of this patent is extended or adjusted under 35 U.S.C. 154(b) by 440 days.

(21) Appl. No.: 18/340,085

(22) Filed: Jun. 23, 2023

(65) Prior Publication Data

US 2023/0417297 A1 Dec. 28, 2023

(51) Int. Cl.
*F16D 65/00* (2006.01)

(52) U.S. Cl.
CPC ..... *F16D 65/0075* (2013.01); *F16D 65/0006* (2013.01)

(58) Field of Classification Search
CPC ............. F16D 65/0006; F16D 65/0068; F16D 65/0075
USPC ................................................ 188/72.4, 73.1
See application file for complete search history.

(56) References Cited

U.S. PATENT DOCUMENTS 5,433,300 A * 7/1995 Barlow ................... F16D 55/22 188/73.1
6,719,104 B1 * 4/2004 Wemple ................. B22D 19/00 188/73.1
7,137,488 B2 * 11/2006 Gilliland ............... F16D 55/228 188/73.47
9,334,909 B2 * 5/2016 Baumgartner .......... F16D 55/00
9,989,112 B1 * 6/2018 Lethorn .............. F16D 65/0068
10,502,275 B2 * 12/2019 Piccoli .................. F16D 55/228
12,516,707 B2 * 1/2026 Shahin ................ F16D 65/0075
2005/0284710 A1 12/2005 Roberts
2019/0203784 A1 7/2019 Giese
2021/0348663 A1 * 11/2021 Lou ........................ F16D 65/183
2023/0304549 A1 * 9/2023 Shahin ................ F16D 65/0075
2024/0280149 A1 * 8/2024 Shahin ................ F16D 65/0056

FOREIGN PATENT DOCUMENTS

CN 206708267 U 12/2017
DE 29818886 U1 4/1999
DE 102010052435 A1 6/2011
DE 102012008003 A1 10/2013
DE 102021210946 A1 4/2022

OTHER PUBLICATIONS

DE Office Action Dated Mar. 1, 2023.

* cited by examiner

*Primary Examiner* — Christopher P Schwartz
(74) *Attorney, Agent, or Firm* — Harvest IP Law, LLP

(57) ABSTRACT

The invention concerns a multi-part brake caliper for a vehicle disc brake, the brake caliper comprising:

a first part comprising a portion that is arrangeable at a first side face of a brake disc of the vehicle disc brake and that is configured to receive a brake piston;

a second part that is formed separately from the first part and comprises a finger portion that is arrangeable at a second side face of the brake disc;

wherein the first part is a metal casted part and the second part comprises sheet metal and wherein the second part further comprises at least one at least partially enclosed hollow section.

11 Claims, 21 Drawing Sheets

MULTI-PART BRAKE CALIPER HAVING AT LEAST ONE HOLLOW SECTION

CROSS-REFERENCE TO RELATED APPLICATION

This application is based on and claims priority under 35 U.S.C. § 119 to German Patent Application No. 102022206469.0, filed on Jun. 27, 2022 in the German Patent and Trade Mark Office, the disclosures of which are incorporated herein by reference.

TECHNICAL FIELD

The invention relates to a multi-part brake caliper for a vehicle disc brake and to a method for producing the same. The vehicle to be braked by the vehicle disc brake may in particular be a road vehicle, such as a car, a truck or a bus.

BACKGROUND

Brake calipers are typically used to support and carry at least one brake pad that is movable relative to a braked member. The braked member may in particular be a brake disc of a vehicle disc brake. The brake caliper may also be referred to as a caliper frame. The brake caliper may receive a brake piston and/or may house at least part of a (e.g. electric or hydraulic) brake actuating mechanism.

Typically, the brake caliper receives and surrounds at least part of the brake disc, such as a radially outer section and/or faces opposite sides of the brake disc. This way, a pair of brake pads that are supported by the brake caliper can be arranged on opposite sides of the brake disc. In a generally known manner, the brake pads can thus clamp the brake disc in between them.

Each brake pad is arranged at one of a first and second inner face of the brake caliper and specifically at a so called finger side or piston side of the brake caliper. Said inner faces and said sides lie on opposite sides of the brake disc and/or are spaced apart from one another along a rotational axis of the braked member.

During brake activation, large forces act on the brake caliper. The brake caliper may thus elastically deform or, put differently, elastically deflect. In existing brake calipers this can be accompanied with a number of disadvantages. For example, an uneven wear of the brake pads and specifically of their brake linings may occur. This may result in further problems, such as the generation of drag torque or noise. Furthermore, a hydraulic volume absorbed by the brake caliper and more specifically by a hydraulic chamber comprised by the brake caliper may increase as a result of the deformation. This additional brake fluid volume absorption is generally undesired for brake performance and safety reasons.

Further disadvantages of existing brake calipers result from their production. Typically, brake calipers are designed as metallic one-piece casted or shaped parts. This puts limitations on their design which e.g. restricts the possibility to improve their elastic deformation characteristics.

DE 10 2010 052 435 A1 disclose a multi-part brake caliper, but the design of this multi-part brake caliper is not configured to address any of the above issues. Rather, it is limited to varying a distance between a finger side and a piston side of the brake caliper by means of a exchangeable spacer.

SUMMARY

It is an object of this disclosure to provide a brake caliper and a method for producing same that limits at least some of the above disadvantages. This object is solved by the subject matter according to the independent claims. Advantageous embodiments are defined in this description, in the figures and in the dependent claims.

Accordingly, a multi-part brake caliper for a vehicle disc brake is suggested. The brake caliper comprises:

- a first part comprising a piston side portion that is arrangeable at a first side face of a brake disc of the vehicle disc brake, the first part being configured to receive a brake piston;
- a second part that is formed separately from the first part and comprises a finger portion that is arrangeable at a second side face of the brake disc;

preferably wherein the first part is a metal casted part and the second part comprises sheet metal, and wherein the second part comprises at least one at least partially enclosed hollow section.

The first part and that second part are configured as a separate members or, put differently, as separate pieces. They are preferably produced separately and with different production methods. They may be assembled and in particular mechanically connected or welded to one another during an assembly process, thereby forming the brake caliper.

The first part and the second part may define a sequence of parts along a rotation axis of the brake disc. The first part may define an outermost axial end portion of the brake caliper when viewed in a first direction of the rotation axis. The second part may define a different outermost axial end portion of the brake caliper when viewed in an opposite second direction of the rotation axis. In other words, the first part and the second part may define opposite outermost axial end portions of the brake caliper.

The first part and the second part may each be one-piece members, in particular integral members having a homogeneous material composition. Alternatively, any of the first part and the second part may be a multi-piece member, wherein said multiple pieces are in particular fixed or joined to one another to provide a coherently movable composite part. Of course, the brake caliper may comprise any combination of any of the first part and the second part being provided as a one piece member or as a multi-piece member.

An optional axial overlap between the first part and the second part may be limited to less than 20% and preferably less than 10% of an axial dimension of at least one of the respective parts (i.e. of at least one of the first part and the second part). This may in particular concern an optional axial overlap in a region of contact and/or a region of mechanical fixation between these parts. The optional axial overlap in said regions may comprise a form fit between the parts, e.g. to contribute to their mechanical connection.

The hollow section may be closed on all sides (i.e. may be a fully enclosed cavity). Alternatively, it may at least largely be closed and/or may be surrounded by a material of the second part on a plurality of different sides (in particular at least two pairs of opposite sides or at least three or four different sides extending at an angle to one another). For example, the hollow section may have not more than three, not more than two or not more than one open side faces.

The hollow section may act as a receiving section for receiving a material that at least partially fills the hollow section. Accordingly, the hollow section does not have to be permanently empty, but e.g. only initially empty prior to being filled with a material, e.g. a vibration damping material. Alternatively, the material can be provided when the hollow section is not yet fully formed, e.g. when not all metal sheet sections forming the second part have been yet connected to one another to form the second part. Generally, the hollow section may define a hollow space within the second part and that is free of a material that otherwise makes up the second part, e.g. that is free of sheet metal or of any other metallic material.

The first part may comprise a cylindric receiving section for receiving the brake piston. Said receiving section may have a circular cross-section. The first part may also comprise at least one annular groove connected to and/or merging with said receiving section for receiving a seal that is configured to establish a fluidically sealing contact with the brake piston.

For producing the second part, as such planar, two-dimensional and/or bent or kinked sheet metal sections may be connected to one another to form a three-dimensional structure. In particular, these parts may be welded together, glued together and/or may be mechanically connected to one another. At least some of said sheet metal sections may form outer surfaces of the second part.

The first part, to the contrary, may be produced by means of one single casting process. A metallic material of the first part and of the second part may be different from one another with the first part e.g. comprising cast iron, whereas the second part comprises steel.

In a generally known manner, a finger side of the brake caliper may represent a side that is opposite to and/or faces away from the brake piston and in particular is arranged opposite to a side face of the brake disc that faces away from the brake piston.

Providing the second part with a hollow section may help to reduce weight. Also and as further discussed below, the hollow section provides a volume in which a vibration dampening material can be received. This can help to limit vibrations and related noise emissions during braking.

By designing the brake caliper as a respective multi-part member and compared to providing known one-piece configurations, it is possible to increase the degrees of freedom for designing each of the first part and the second part. For example, each of the first part and the second part may be produced independently of the respective other part. This provides freedom with respect to a selection of production methods as well as a selection of materials, dimensions or shapes. In consequence, the different parts may be optimized with respect to the overall deformation characteristics of the brake caliper and/or with respect to their individual production costs.

Other advantages may be achieved by securing the first part and the second part by means of a specific connection. For example, in particular when providing a mechanical connection, this may help to dissipate at least part of the deformation energy occurring under high brake loads. Additionally or alternatively, the mechanical connection may provide an elastic joint function. This may help to alter the deformation characteristics in a desired manner.

Generally, a preferred deformation characteristic may be marked by the inner faces of the first part and the second part which face the brake disc (or, the piston side and the finger side of the brake caliper) essentially maintaining their relative orientation to one another even under high brake loads. For example, they may maintain an essentially parallel orientation to one another. This e.g. helps to limit irregular brake pad wear and non-uniform heat generation of the brake pads connected to said parts as well as any of the other drawbacks mentioned in the above introductory portion.

In more detail, it has been determined that as a result of the elastic deformation of existing brake calipers a significant deformation or deflection of the inner faces of the brake caliper facing the brake disc and typically carrying the brake pads may occur. As a result, an axial distance between said faces may increase and may locally vary. For example, the faces may slightly tilt with respect to one another and/or with respect to the rotational axis of the brake disc. They may thus assume a non-parallel orientation and/or may generally become slanted, in particular at different angles compared to one another. This may result in an uneven widening of a gap between the faces and/or in uneven axial local deflections and displacements across and within each face. This may e.g. promote uneven wear of the brake pads. This may at least partially be prevented by the solution disclosed herein.

Compared to existing multi-part designs, the present solution promotes the desired deformation characteristic by manufacturing the first and second part from different materials and/or different manufacturing technologies, thereby rendering their connection more deformable and/or weaker. Thus, the connection between said members may be configured to dissipate larger amounts of deformation energy instead of bending the first part and second part and/or their respective inner side faces as such.

According to one example, the first part and the second part are secured to one another by welding. This may provide a permanent and reliable connection that does not require a subsequent maintenance and frequent checks.

Additionally or alternatively, the first part and the second part may be mechanically secured to one another by means of at least one mechanical fixing element (e.g. a screw, a bolt or a rivet). This mechanical fixation may be releasable. Through holes or recesses may be provided in the mechanically connected parts for receiving the optional mechanical fixation element. The mechanical fixation may be the only fixation provided between the respective parts. For example, these parts may not be additionally glued or welded together. This may improve deformation characteristics of the brake calliper and reduce production costs.

In this connection, the mechanical fixing element may be connected to (or arranged or received at) an upper side of the first part that faces away from a circumferential face of the brake disc. The upper side may extend substantially in parallel to a rotational axis of the brake disc and/or at an angle to the inner faces of the first part and second part that face the brake disc. At this upper side, sufficient space may be available to produce an overlap between the first and second part that can be secured by means of the fixing element. Also, the upper side may be easily accessible for tightening the fixing element. Further, an overlap produced at this upper side may contribute to desired deformation characteristics by providing an additional stiffening effect preventing that the finger side or piston side tilt relative to one another.

Alternatively, the mechanical fixing element may be connected to (or arranged or received at) a front side the first part. This front side may extend at an angle and in particular orthogonally to the rotation axis (or at least at an angle that is larger than an angle between the upper side and the rotation axis). The front side may face of the second part. It may extend in parallel to the inner side face of the second part that faces the brake disc. Arranging the mechanical fixing element at said front side can help to limit the size of the brake caliper. Also, it may allow for a closer position of the mechanical fixing element to a region of particularly high elastic deformations, so that a respectively large share of deformation energy can be dissipated by the mechanical connection.

There may also be a plurality of mechanical fixing elements that may be arranged at different sides of the brake caliper, in particular at least one at an upper side and at least one at a front side as disclosed above.

According to one example, the first part and the second part are non-disassemblable parts. Put differently, they may be integral or homogeneous parts e.g. only comprising one type of material.

Further, the hollow section may be filled with a vibration damping material. This vibration dampening material may be a non-metallic material. It may be a loose material, such as a bulk material. It may comprise a foam material, a porous material or a material that is more elastic and/or softer than a material of the first part. Other examples of vibration dampening materials include materials comprising or consisting of an elastomer, a phenolic material, a fibre reinforced plastic (e.g. glass fibre, carbon fibre or aramid fibre), a polyurethane foam or a hard polyvinylchloride foam. The vibration dampening material may comprise any combination of any of the material examples disclosed herein.

According to another example, the hollow section is at least partially comprised by the finger portion. Generally, the second part may comprise a finger portion that e.g. extends substantially in parallel to and/or along a respectively opposite side face of the brake disc. Additionally, the finger portion may comprise a free end of the second part that e.g. faces radially inward. The second part may also comprise a further portion extending at an angle to the finger portion and in particular at a smaller angle to a rotation axis. In one example, this further portion may extend towards the second part. Generally, this further portion together with the finger portion may define an angled or L-shaped cross-section of the first part. This further portion may also comprise a hollow section or a part of the same hollow section that is also comprised by the finger portion. Alternatively, the further portion may not be hollow. The further portion may form at least part of a middle portion of the brake caliper.

Specifically, in one embodiment the brake caliper has a middle portion that is arrangeable opposite to a circumferential face of the brake disc, the middle portion being comprised either by the first part of the second part. The middle portion may extend from the finger side to the piston side. It may thus have sections that whose axial positions overlap and/or coincide with axial positions of both side faces of the brake disc and/or with both axial positions of the inner faces of the first part and second part that face the brake disc. The middle portion may be integrally formed with or be comprised by the first part or the second part. For example, it may be integrally formed with and/or be directly connected to a finger portion of the first part.

When the second part comprises the middle portion, the hollow section may be provided in said middle portion. According to an embodiment, it is also possible that the hollow section is comprised by the middle portion when said middle portion is comprised by the first part. Yet, it may be simpler to produce a middle portion based on the metal sheet design of the first part compared to the casting design of the second part. This is in particular valid when intending to provide a hollow section having a significant volume.

As a general aspect of this disclosure, the hollow section may comprise at least 5%, at least 10%, at least 20% or at least 40% of a volume of the second part. This allows for a significant weight reduction of said second part and/or for receiving a respectively large volume of a vibration damping material in the hollow section.

It may be provided that, when the second part comprises both of the finger portion and middle portion, each of the finger portion a middle portion comprises a hollow section. These hollow sections in the finger portion and in the middle portion may be connected to one another. Alternatively, they may be separated of the respective other hollow section.

A thickness of the material used for forming the second part may generally vary. For example, the second part may be formed by a number of sheet metal sections that are joined to one another. The thickness of these sheet metal sections may be constant or may vary, in particular as a function of local stresses that the second part experiences during braking. When the second part comprises the finger portion and the middle portion, the thickness of at least one sheet metal section comprised by the middle portion may be different from the thickness of at least one sheet metal section comprised by the finger portion. For example, said thickness may be lower, in particular at an upper side of the middle portion. It may at most be two thirds or at most half as large as the thickness of the sheet metal section of the finger portion. In one example, at least one sheet metal section comprised by the middle portion has a thickness of 2 to 4 mm, whereas at least one sheet metal section comprised by the finger portion has a thickness of 5 to 8 mm.

In one example, the average or maximum thickness of the sheet metal sections comprised by the finger portion exceeds the average and/or maximum thickness of the sheet-metal portions comprised by the middle portion. Generally, lowering the thickness of at least selected sheet metal sections further helps to reduce weight and material costs.

According to another embodiment, the second part comprises a shim, e.g. at its inner face facing an opposite side face of the brake disc. The shim may e.g. be attached to the second part by glueing.

The invention also relates to a method of producing a brake caliper for a vehicle disc brake, the brake caliper comprising:

- a first part comprising a portion that is arrangeable at a first side face of a brake disc of the vehicle disc brake and that is configured to receive a brake piston;
- a second part that is formed separately from the first part and comprises a finger portion that is arrangeable at a second side face of the brake disc;

wherein, preferably, the first part is a metal casted part and the second part comprises sheet metal, and wherein the second part comprises an at least partially enclosed hollow section;

the method comprising:

securing the first part and second part to one another (e.g. mechanically and/or by welding).

The method may comprise any further measures discussed herein for producing a brake caliper according to any disclosed example. For example, the method may comprise a step of filling the hollow section with a vibration damping material.

BRIEF DESCRIPTION OF DRAWINGS

Embodiments of the invention are discussed in the following with respect to the attached schematic figures. Same or similar features may be marked with same reference signs throughout the figures.

DETAILED DESCRIPTION

Figure 1:
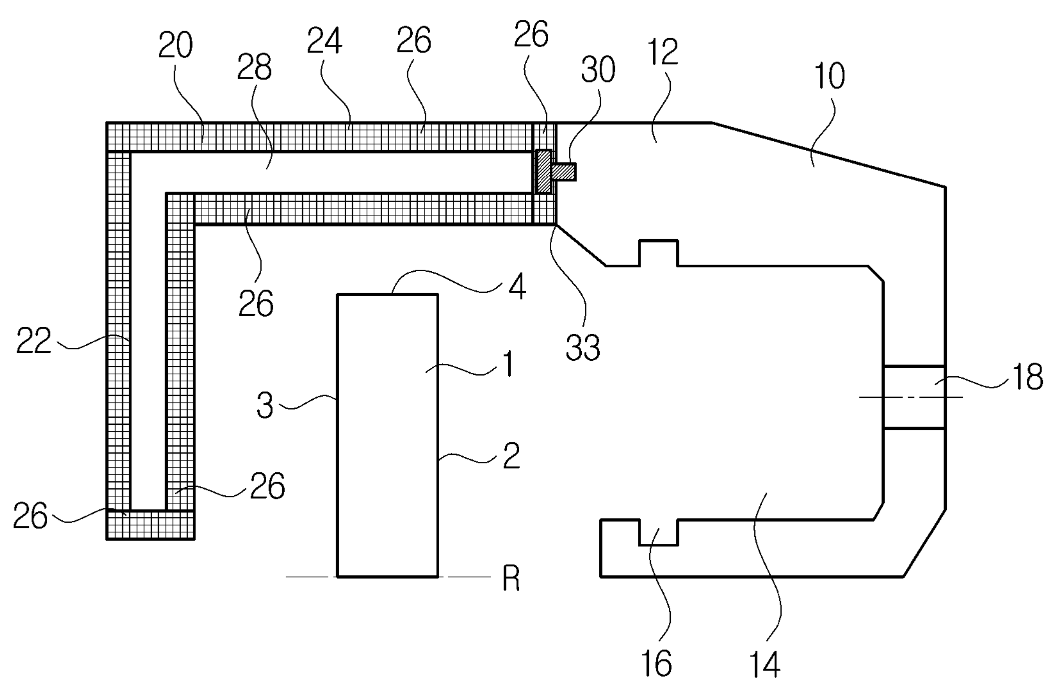
FIG. 1 is a sectional view of a multi-part brake caliper according to an embodiment of the invention.

FIG. 1 is a sectional side view of the brake caliper 10 according to a first embodiment of the invention. FIG. 1 also schematically illustrates a radially upper half of the brake disc 1, the brake disc rotating about a rotation axis R and generally extending concentrically thereto. The size relations in FIG. 1 between the brake caliper 10 and the brake disc 1 are only schematic and the brake disc 1 may be significantly larger than illustrated.

The brake disc 1 and rotation axis R are not specifically illustrated in the further FIGS. 2-8. Nonetheless, once the brake caliper 10 is mounted to a vehicle, the brake disc 1 and rotation axis R are arranged in a similar manner relative to the brake calipers 10 depicted in said further FIGS. 2-8 as well.

The brake caliper 10 comprises a first part 12 which is a casted part and specifically a cast iron part. The first part 12 comprises a cylindric receiving section 14 for receiving a non-illustrated brake piston. It also comprises an annular groove 16 in which a non-illustrated seal can be received for generating a fluidically sealed contact with the brake piston. The annular groove 16 is arranged within the receiving section 14. The first part 12 further comprises a brake fluid channel 18 that is fluidically connected to the receiving section 14. In a generally known manner, brake fluid can enter a hydraulic chamber defined by the receiving section and the brake piston to move the brake piston for activating or releasing the brake.

The first part 12 is arranged at a first side face 2 of the brake disc 1 and generally forms or comprises a piston side of the brake caliper 10. In a generally known manner, a non-illustrated brake pad may be arranged at said piston side and received in and/or guided by the brake caliper 10. Also, said brake pad may be forced into contact with the side surface 2 of the brake disc 1 by the brake piston that is received in the first part 12.

The brake caliper 10 also comprises a second part 20. The second part 20 comprises a finger portion 22 facing the respective opposite side face 3 of the brake disc 1. The finger portion 22 extends along said side face 3 and may generally extend at an angle to the rotation axis R that is larger than 60°. In the shown example, the finger portion 22 extends orthogonally to the rotation axis R.

Again, in a generally known manner, a non-depicted brake pad may be arranged at and may be carried by said finger portion 22. According to known floating caliper principles, this brake pad may be pushed into contact with the second side face 3 when exerting a pressure on the respective opposite brake pad by means of the brake piston.

The second part 20 also comprises a middle portion 24 of the brake caliper 10. This middle portion 24 axially spans across the brake disc 1. Accordingly, its axial positions (e.g. when viewed along the rotation axis R) overlap with the axial positions of both side faces 2, 3 of the brake disc 1. Also, the middle portion 24 faces an outer circumferential face 4 of the brake disc 1. In the shown example, the middle portion 24 generally extends along the rotation axis R and, together with the finger portion 22, forms an L-shaped or angled cross-sectional shape of a second part 20.

The second part 20 is a sheet metal part comprising a plurality of sheet metal sections 26 that are joined to one another, e.g. by welding. In the shown example, these sheet metal sections 26 are arranged and connected in order to (in this example fully) enclose a hollow section 28 of the second part 20. Accordingly, the hollow section 28 forms a cavity within the second part 20. This reduces weight. Optionally, the hollow section 28 can be filled with a vibration dampening material according to any of the examples disclosed herein.

In the embodiment of FIG. 1, the first part 12 and the second part 20 are mechanically connected to one another by means of at least one mechanical fixing element 30 in form of a screw. The position of the mechanical fixing element 30 along an axis that is orthogonal to the image plane is highly schematic. It may actually be positioned outside of the sectional plane and closer to or further away from the image plane. For example, it may be positioned at a distance to the hollow section 28 so as to be accessible from outside the hollow section 28. Accordingly, in a plane extending orthogonally to the rotation axis R, two mechanical fixing elements 30 may be positioned outside of and on both sides of the hollow section 28 and may be unobstructed by any of the sheet metal sections 26 of the second part 20.

The mechanical fixing element 30 is arranged at and received in a front side 33 of the first part 12 which limits the radial dimensions of the brake caliper 10 (i.e. the dimensions in a direction orthogonally to the rotation axis R).

Figure 2:
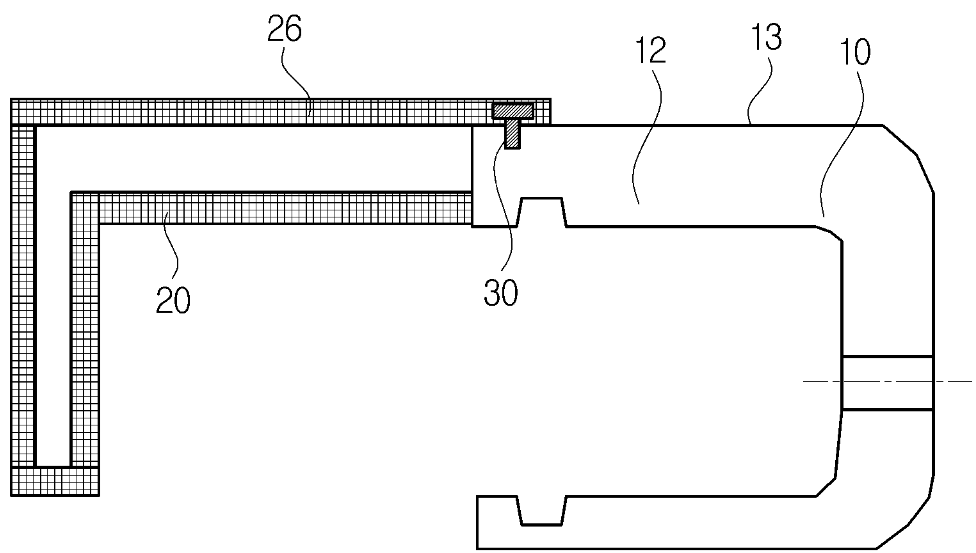
FIG. 2 is a sectional view of a multi-part brake caliper according to another embodiment of the invention.

In FIG. 2, another embodiment is shown which largely corresponds to that of FIG. 1. Generally, in connection with FIG. 2 as well as any of the remaining figures, features that are identical or similar to any of the previously discussed embodiments may not be elaborated upon again.

The main difference to the embodiment of FIG. 1 is the position of the at least one mechanical fixing element 30 which secures the first part 12 and second part 20 to one another. Specifically, this mechanical fixing element 30 is arranged at and received in an upper side 13 of the brake caliper 10 and specifically of the first part 12. For doing so, one of the metal sheet sections 26 of the second part 20 and specifically one that forms at least part of an upper side of said second part 20 overlaps with and contacts the upper side 13 of the first part 12.

In FIG. 2, again more than one mechanical fixing element 30 may be provided, e.g. a plurality of mechanical fixing elements 30 that are distributed along an axis extending orthogonally to the image plane.

Figure 3:
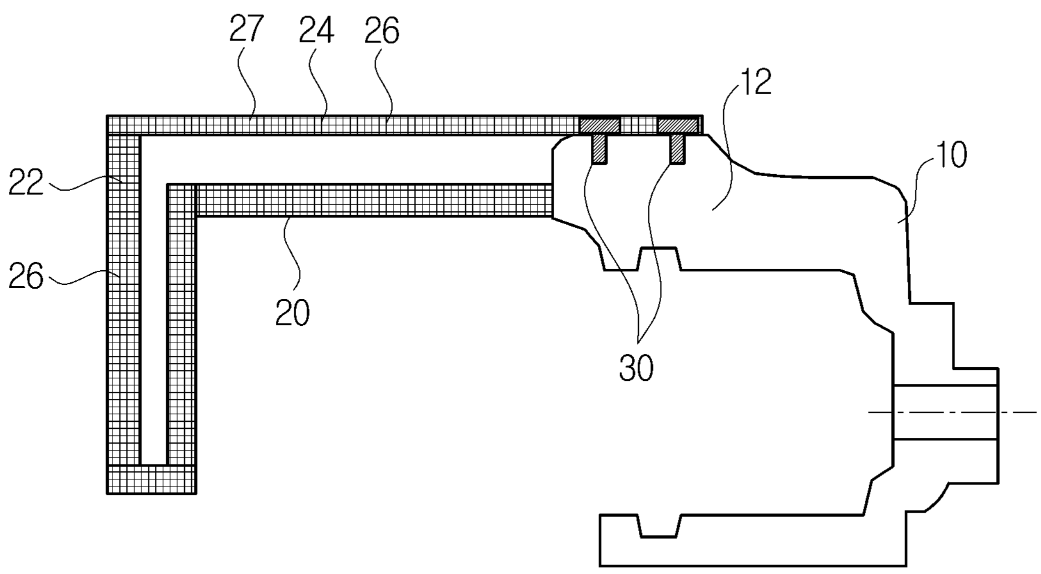
FIG. 3 is a sectional view of a multi-part brake caliper according to another embodiment of the invention.

FIG. 3 shows an example in which a respective plurality of mechanical fixing elements 30 is provided but arranged along an axis extending in the image plane. Nonetheless, it may still be provided that additional fixing elements 30 are arranged along an axis orthogonally to the image plane.

FIG. 3 also illustrates that the sheet metal sections 26 of the second part 20 may have different thicknesses (or strengths). For example, the thicknesses may be varied depending upon expected stresses that the corresponding regions of the second part 20 are exposed to during braking. For example, the middle portion 24 may comprise a sheet metal section 27 with a reduced thickness that, in the shown example, forms at least part of an upper side of the middle portion 24. This is because this upper side is exposed to comparatively low stresses. The sheet metal sections 26 of the finger portion 22, to the contrary, may be thicker in comparison. In one example, the average or maximum thickness of the sheet metal sections 26 comprised by the finger portion 22 may exceed the average and/or maximum thickness of the sheet metal sections 26 comprised by the middle portion 24.

Figure 4:
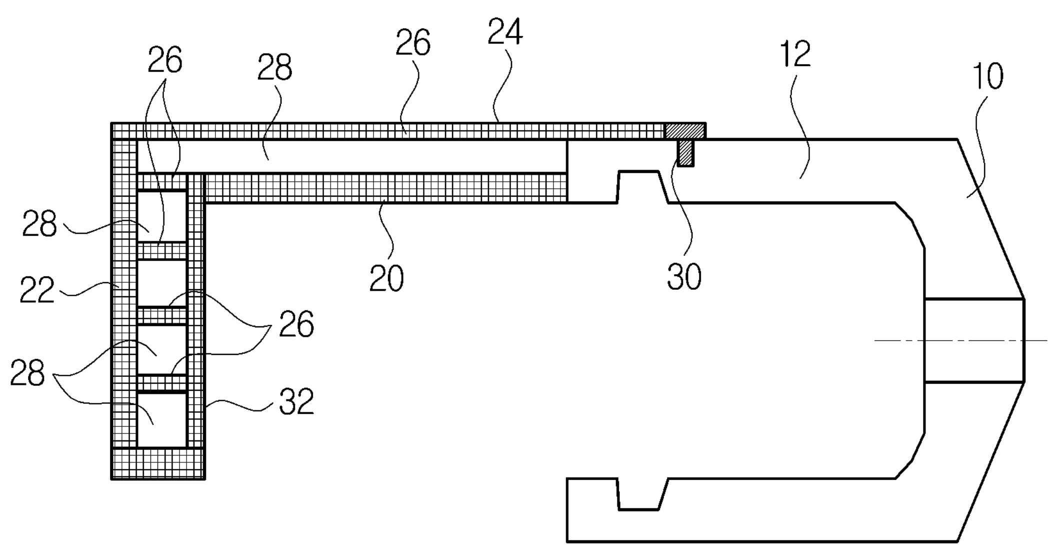
FIG. 4 is a sectional view of a multi-part brake caliper according to another embodiment of the invention.

In FIG. 4, the design of the second part 20 significantly differs from that of the previous embodiments. Specifically, its finger portion 22 comprises a number of hollow sections 28. These are formed as a type of chamber within the finger portion 22 and by including internal web-like sheet metal sections 26 that do not form part of an outer surface of the finger portion 22. The middle portion 24, on the other hand, which is again comprised by the second part 20 also comprises a hollow section 28. This is not mandatory and the middle portion 24 could be free of a respective hollow section 28. The hollow sections 28 of the finger portion 22 and middle portion 24 do not merge with one another, i.e. are separated by at least one sheet metal section 26.

In one optional example, at least some of the hollow sections 28 of the finger portion 22 are filled with a vibration dampening material, whereas the hollow section 28 of the middle portion 24 is empty. An opposite filling is possible as well, i.e. the hollow section of the middle portion 24 being filled, whereas the hollow sections 28 of the finger portion 22 are empty.

Figure 5:
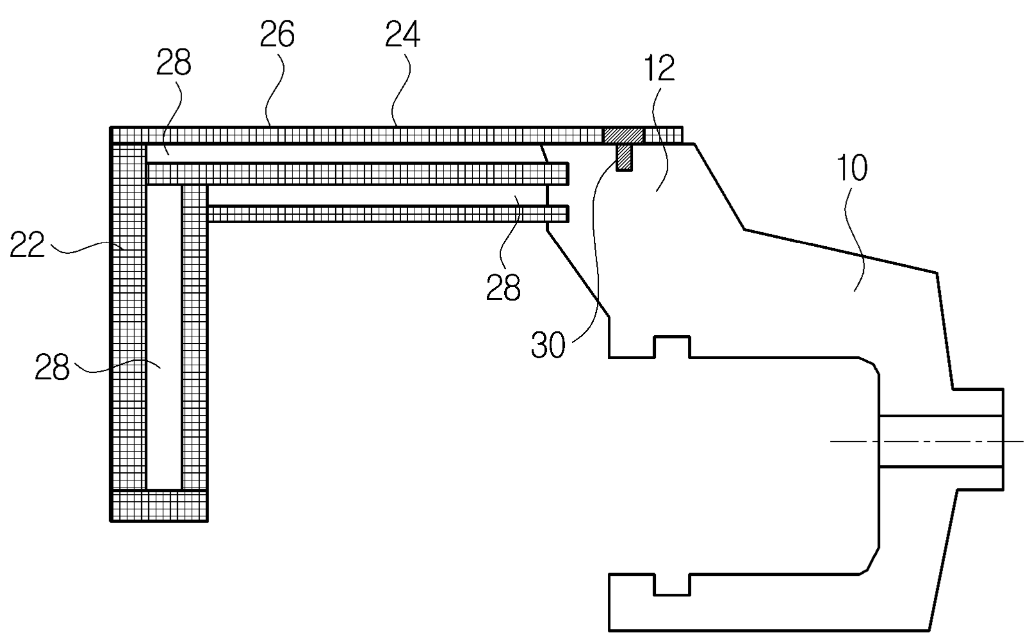
FIG. 5 is a sectional view of a multi-part brake caliper according to another embodiment of the invention.

FIG. 5 shows a further example. In this case, the middle section 24 has a plurality of hollow sections 28. Both extend in parallel to one another and in parallel to the rotation axis R. The finger portion 22 also has a hollow section 28. Any of said hollow sections 28 can be filled with a vibration dampening material or can be empty.

Figure 6:
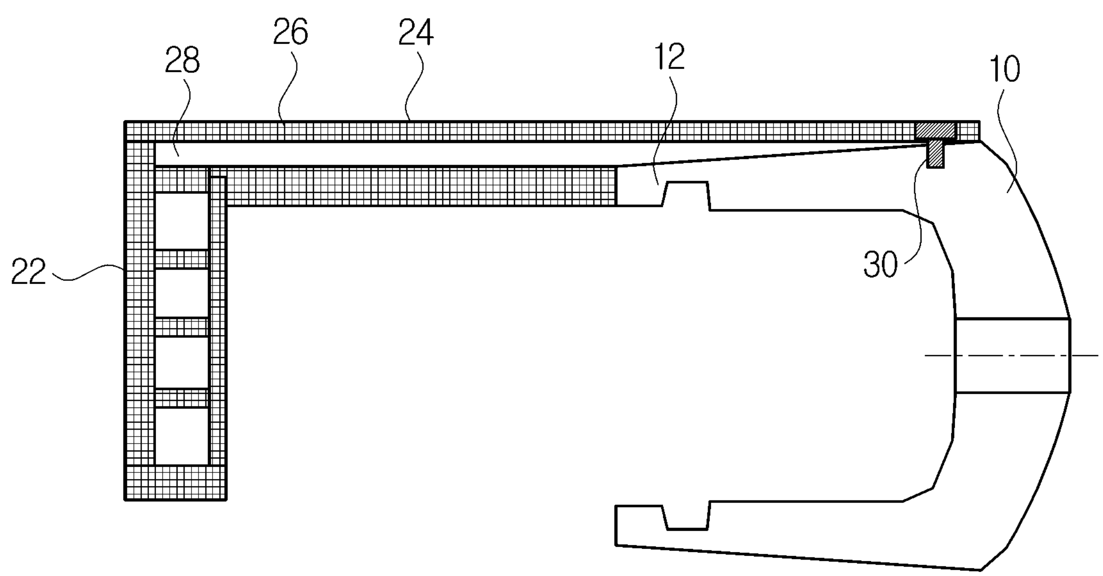
FIG. 6 is a sectional view of a multi-part brake caliper according to another embodiment of the invention.

In the embodiment of FIG. 6, the finger portion 22 is configured similar to the example of FIG. 4 by comprising a plurality of hollow section 28. The middle section 28 comprises a hollow section, too. Compared to FIG. 4, it is more elongated, thereby increasing an axial overlap (e.g. increasing an axial length of said overlap) between the first part 14 and the second part 20.

Figure 7:
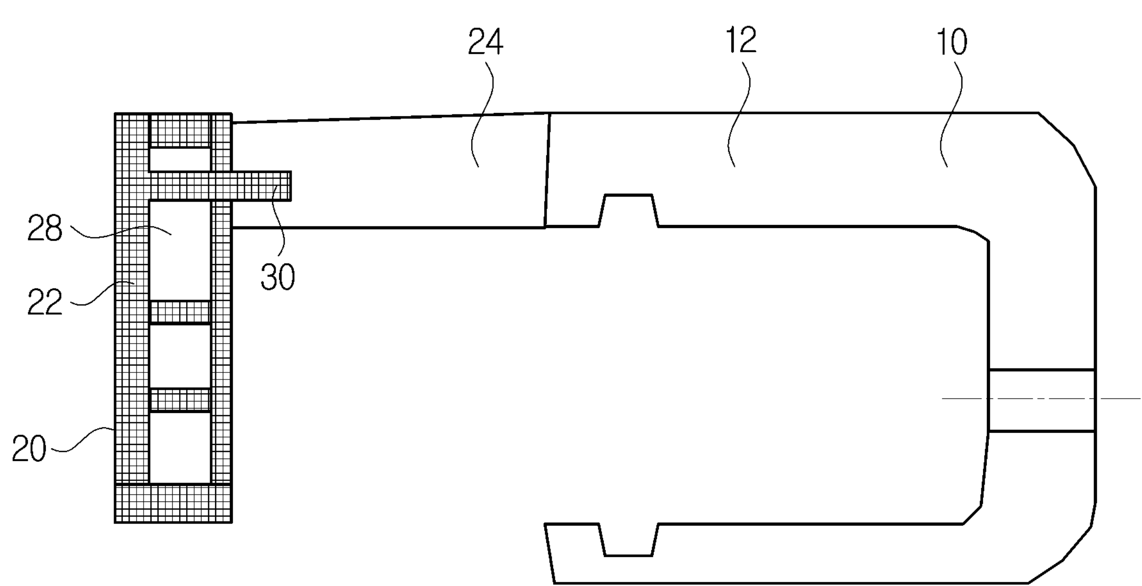
FIG. 7 is a sectional view of a multi-part brake caliper according to another embodiment of the invention.
Figure 8:
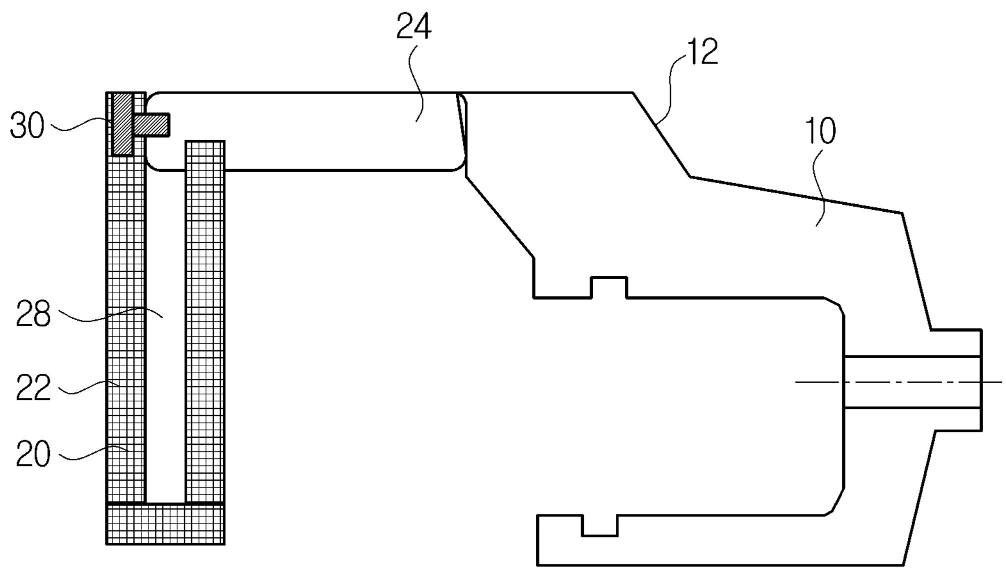
FIG. 8 is a sectional view of a multi-part brake caliper according to another embodiment of the invention.

FIGS. 7 and 8 show examples in which the middle portion 24 is comprised by the first part 12. Specifically, it is formed as an integrally casted section of the first part 12. The second part 20 thus only comprises the finger portion 22 and is connected to a front face of the middle portion 24. In FIG. 7, this connection comprises a pin as mechanical fixing element 30, said pin being force fit into a hole of the first part 14. In FIG. 8, the mechanical fixing element 30 is a screw.

In both of FIGS. 7 and 8, the second part 20 comprises at least one hollow section 28 that is either empty or filled, in particular with a vibration damping material.

An advantage of the embodiment of FIG. 8 is that the mechanical fixing element 30 can also be used to fix a (non-illustrated) further member in an easily visible position. Said member my e.g. a Logo-Clip, a manufacturer identity plate, a product type plate or the like. This member may rest against a front face of the finger portion 22 that faces to the left in FIG. 8.

An advantage of the invention in general and especially of FIGS. 2, 3 and 6 is that optimisation with respect to NVH (noise, vibration, harshness) characteristics can focus on only one of the parts 12, 20, e.g. focusing on said part 12, 20 as a modifiable and/or exchangeable part 12, 20 without re-designing the complete caliper 10.

Figure 9:
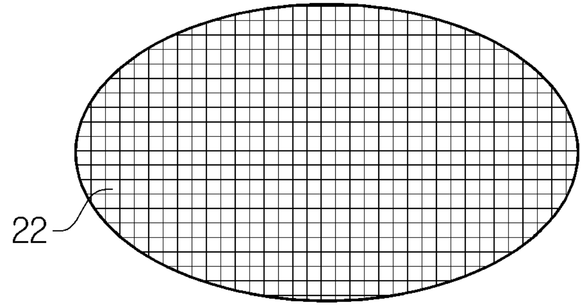
FIGS. 9-11 are front views of second parts of multi-part brake calipers according further embodiments of the invention.
Figure 10:
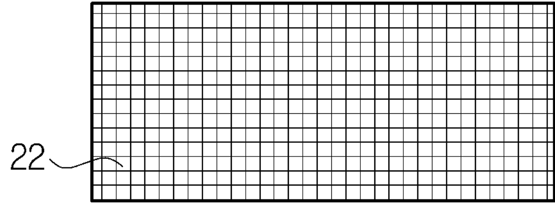
Figure 11:
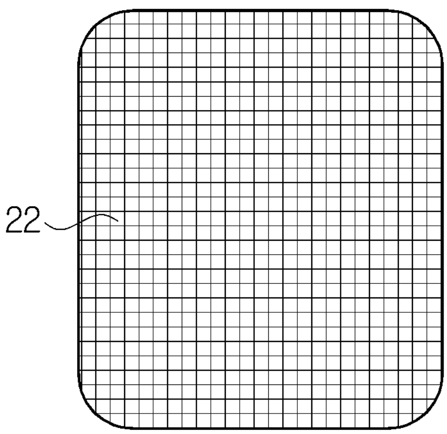
Figure 12:
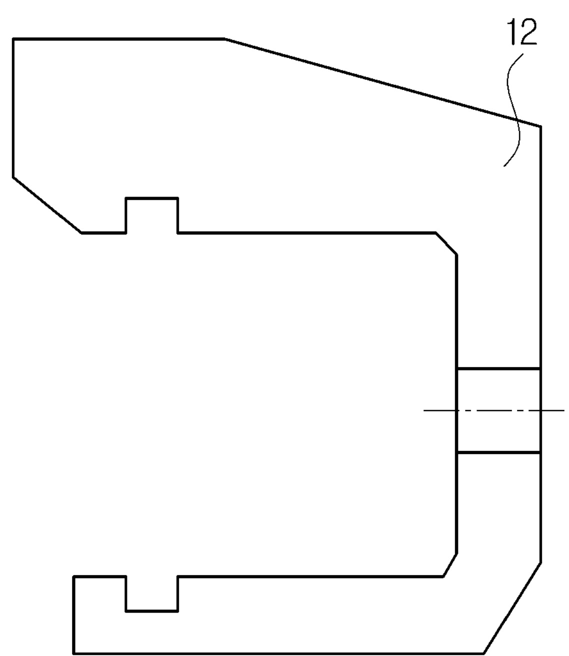
FIGS. 12-17 are sectional views of first parts of multi-part brake calipers according further embodiments of the invention.
Figure 13:
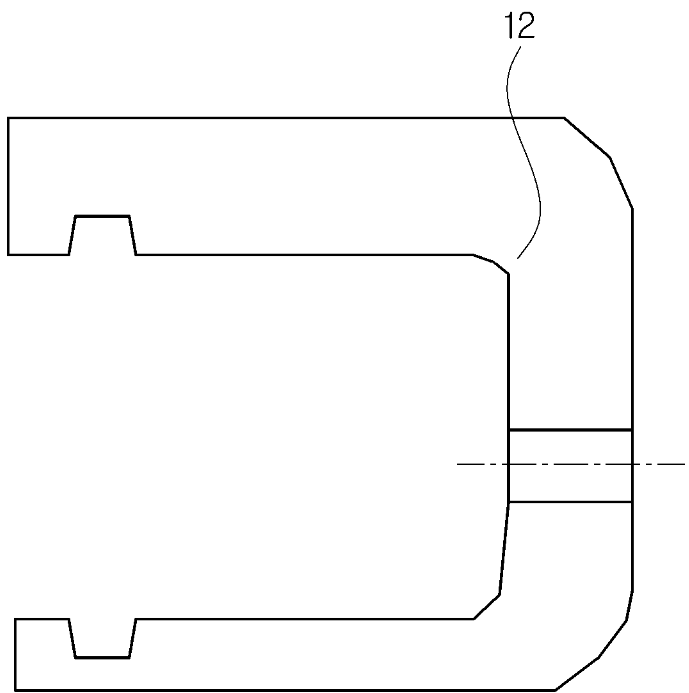
Figure 14:
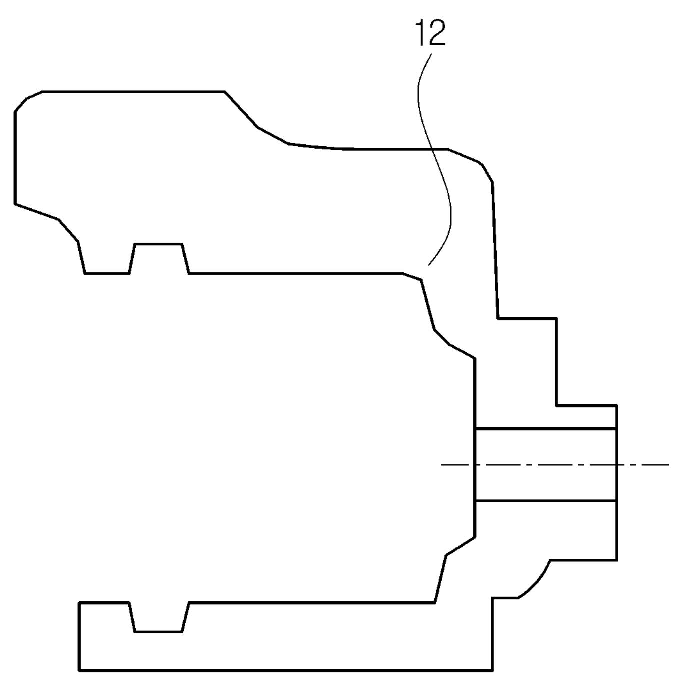
Figure 15:
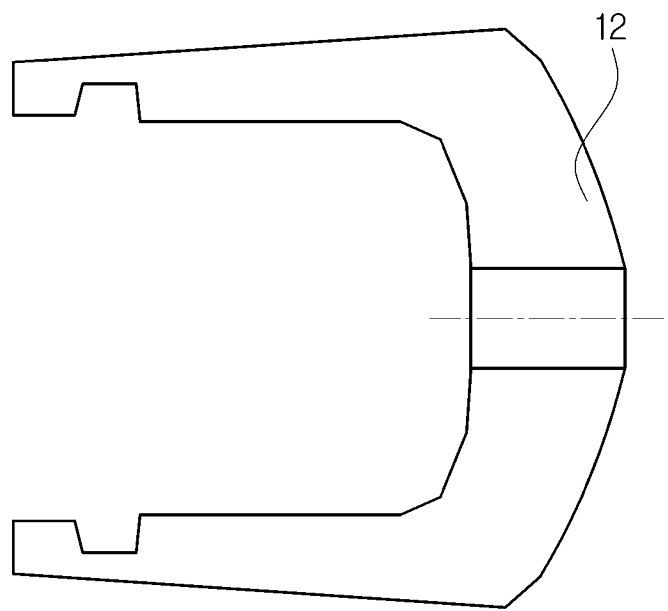
Figure 16:
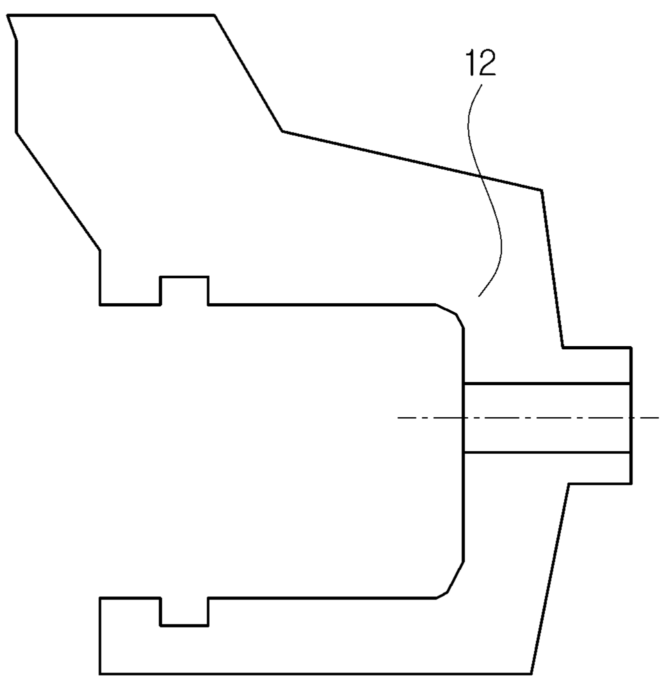
Figure 17:
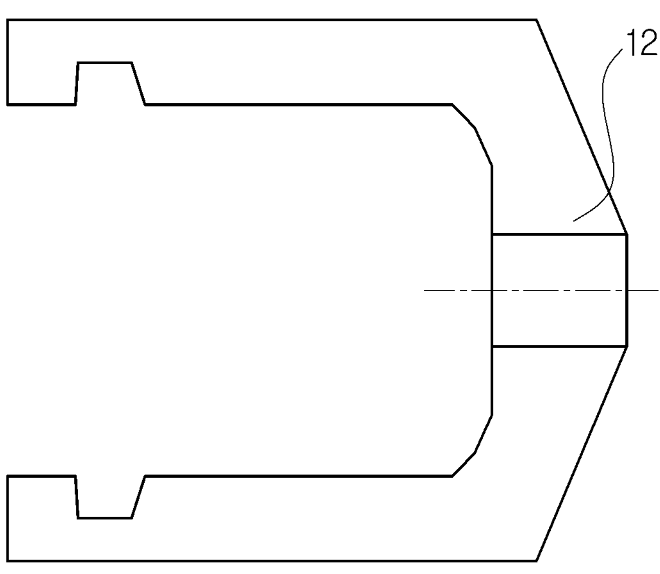
Figure 18:
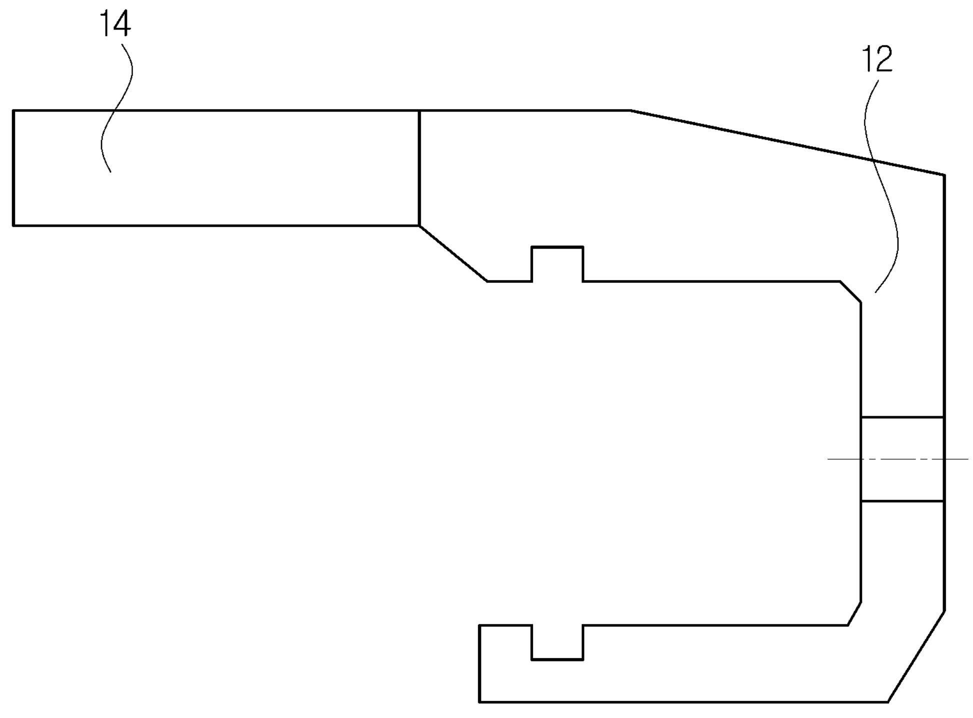
FIGS. 18-21 are sectional views of first parts of multi-part brake calipers according further embodiments of the invention.
Figure 19:
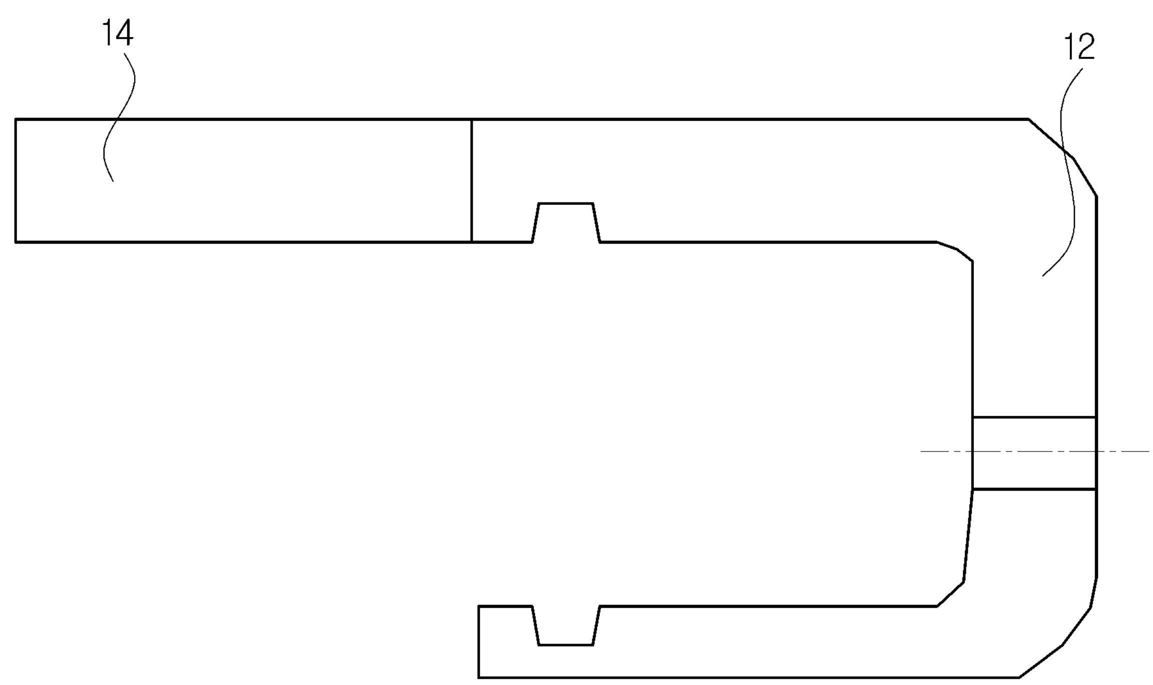
Figure 20:
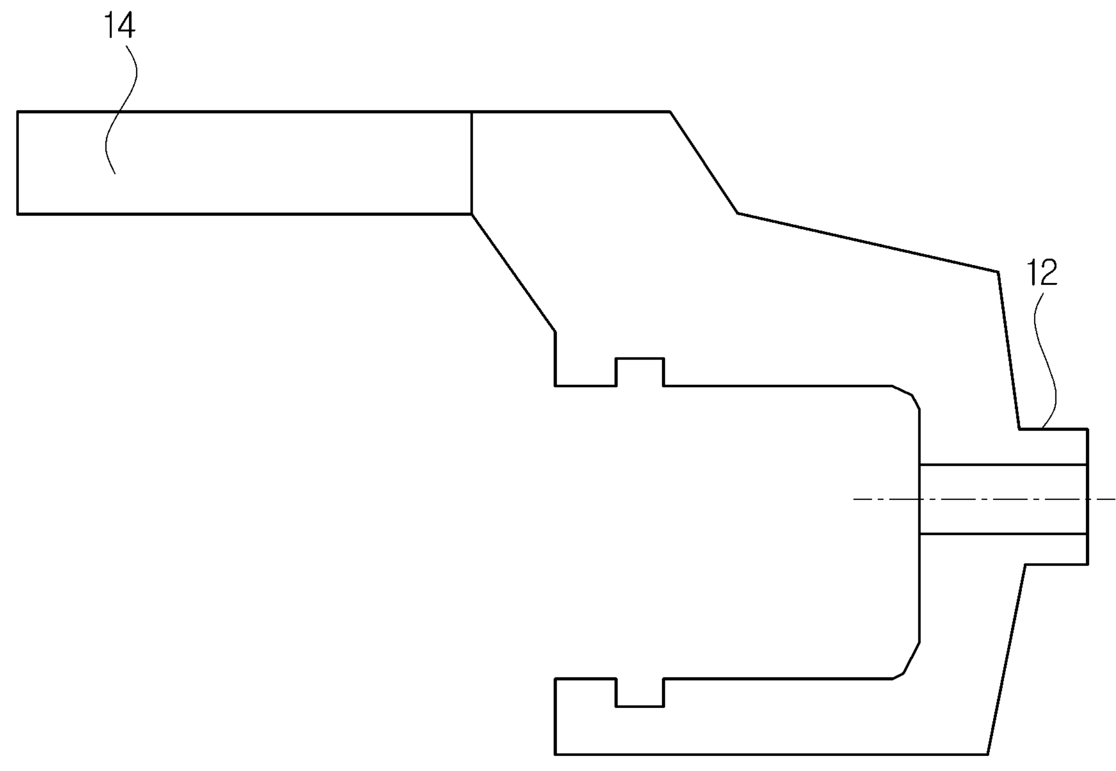
Figure 21:
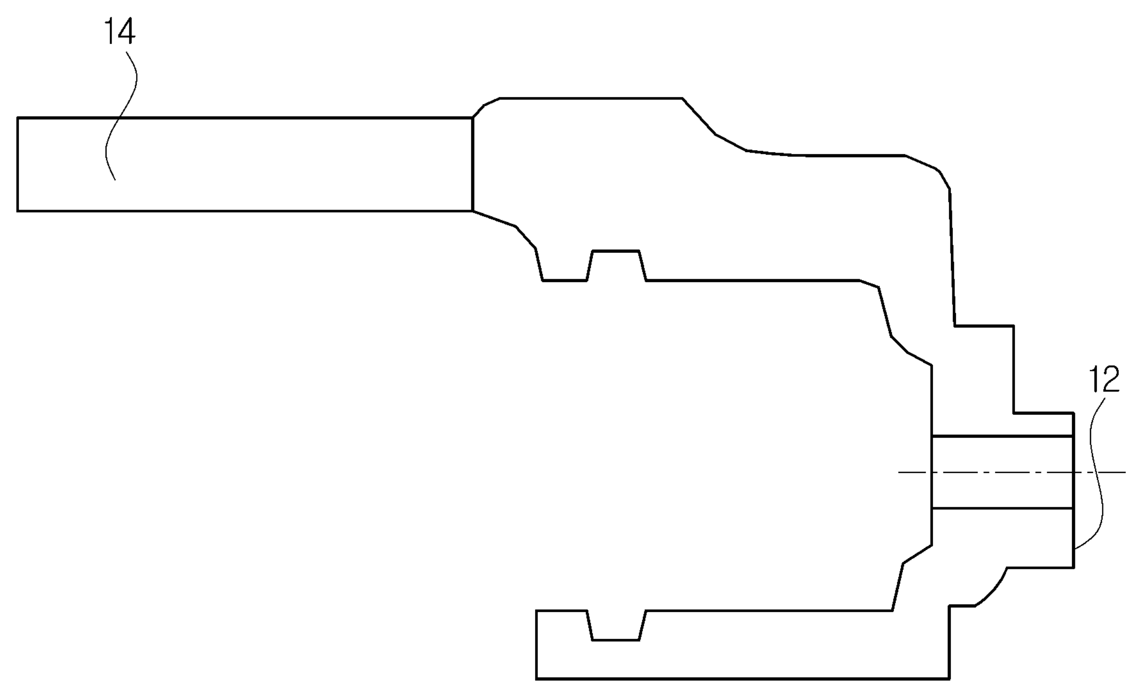

FIGS. 9-11 are front views of second parts 20 with the second part 20 turned towards the viewer by 90° compared to FIGS. 1-8. FIGS. 9-11 illustrate an exemplary range of possible designs of the second part 20 and in particular of its front face depicted in said figures. In FIG. 9, said front face is oval whereas in FIGS. 10 and 11, said front face is rectangular but sized and oriented differently. These differences in shapes, sizes and orientations are made possible by the second part 20 being produced separately from the first part 12 and not being produced by metal casting.

FIGS. 12-17 are views of possible designs of the first part 12, said designs also being included in FIGS. 2-6 with the first part 12 not including the middle portion 24.

FIGS. 18-21 are also views of possible designs of the first part 12, but with the first part 12 including the middle portion 24. This variability in designs is again supported by the first part 12 being produced separately from the second part 20, which increases the degrees of freedom in its design.

What is claimed is:

1. A multi-part brake caliper for a vehicle disc brake, the brake caliper comprising:

a first part comprising a portion that is arrangeable at a first side face of a brake disc of the vehicle disc brake and that is configured to receive a brake piston;

a second part that is formed separately from the first part and comprises a finger portion that is arrangeable at a second side face of the brake disc;

wherein the first part is a metal casted part and the second part comprises sheet metal sections and wherein the second part further comprises at least one at least partially enclosed hollow section, wherein the brake caliper has a middle portion that is arrangeable opposite to a circumferential surface of the brake disc, the middle portion being comprised either by the first part or by the second part, wherein the middle portion extends from a finger side to a piston side, wherein the middle portion comprises a sheet metal section with a reduced thickness that forms at least part of an upper side of the middle portion, and wherein an average or maximum thickness of the sheet metal sections comprised by the finger portion exceeds an average or maximum thickness of the sheet metal sections comprised by the middle portion.

2. The brake caliper according to claim 1, wherein the second part comprises the middle portion and wherein the hollow section is provided in the middle portion.

3. The brake caliper according to claim 2, wherein the hollow section is comprised at least partially by the finger portion, and wherein each of the finger portion and the middle portion comprises a hollow section.

4. The brake caliper according to claim 3, wherein the hollow sections in the finger portion and in the middle portion are connected to one another.

5. The brake caliper of claim 1, wherein the first part and the second part are secured to one another by welding.

6. The brake caliper of claim 1, wherein the first part and the second part are mechanically secured to one another by means of at least one mechanical fixing element in particular wherein the mechanical fixing element is connected to an upper side of the first part that faces away from a circumferential face of the brake disc.

7. The brake caliper according to claim 1, wherein the first part and the second part are non-disassemblable parts.

8. The brake caliper according to claim 1, wherein the hollow section is filled with a vibration damping material.

9. The brake caliper according to claim 1, wherein the hollow section is comprised at least partially by the finger portion.

10. The brake caliper according to claim 1, wherein the middle portion has a plurality of hollow sections, wherein the plurality of hollow sections extend in parallel to one another and in parallel to a rotation axis R of the brake disc.

11. A method of producing a brake caliper for a vehicle disc brake, the brake caliper comprising:

a first part comprising a portion that is arrangeable at a first side face of a brake disc of the vehicle disc brake and that is configured to receive a brake piston;

a second part that is formed separately from the first part and comprises a finger portion that is arrangeable at a second side face of the brake disc;

wherein the first part is a metal casted part and the second part comprises sheet metal sections and wherein the second part further comprises at least one at least partially enclosed hollow section;

wherein the brake caliper has a middle portion that is arrangeable opposite to a circumferential surface of the brake disc, the middle portion being comprised either by the first part or by the second part, wherein the middle portion extends from a finger side to a piston side, wherein the middle portion comprises a sheet metal section with a reduced thickness that forms at least part of an upper side of the middle portion, and wherein an average or maximum thickness of the sheet metal sections comprised by the finger portion exceeds an average or maximum thickness of the sheet metal sections comprised by the middle portion, the method comprising:

securing the first part and second part to one another.

* * * * *